United States Patent
Stellmach et al.

(10) Patent No.: US 11,620,000 B1
(45) Date of Patent: Apr. 4, 2023

(54) CONTROLLED INVOCATION OF A PRECISION INPUT MODE

(71) Applicant: MICROSOFT TECHNOLOGY LICENSING, LLC, Redmond, WA (US)

(72) Inventors: Sophie Stellmach, Kirkland, WA (US); Julia Schwarz, Bellevue, WA (US); Erian Vazquez, Bothell, WA (US); Kristian Jose Davila, Redmond, WA (US); Thomas Matthew Gable, Seattle, WA (US); Adam Behringer, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/710,940

(22) Filed: Mar. 31, 2022

(51) Int. Cl.
| | |
|---|---|
| G06F 3/01 | (2006.01) |
| G06V 40/20 | (2022.01) |
| G06V 40/10 | (2022.01) |
| G02B 27/01 | (2006.01) |
| G02B 27/00 | (2006.01) |

(52) U.S. Cl.
CPC ......... *G06F 3/017* (2013.01); *G02B 27/0093* (2013.01); *G02B 27/0101* (2013.01); *G02B 27/017* (2013.01); *G02B 27/0179* (2013.01); *G06F 3/012* (2013.01); *G06F 3/013* (2013.01); *G06V 40/113* (2022.01); *G06V 40/28* (2022.01);

(Continued)

(58) Field of Classification Search
CPC .......... G06F 3/017; G06F 3/012; G06F 3/013; G02B 27/0093; G02B 27/0101; G02B 27/017; G02B 27/0179; G02B 2027/0138; G02B 2027/0187; G06V 40/113; G06V 40/28
See application file for complete search history.

(56) References Cited

U.S. PATENT DOCUMENTS

| | | | |
|---|---|---|---|
| 11,278,810 B1* | 3/2022 | Sarria, Jr ................ A63F 13/53 |
| 2012/0146891 A1* | 6/2012 | Kalinli .................. A63F 13/428 |
| | | | 345/156 |

(Continued)

FOREIGN PATENT DOCUMENTS

WO    2019226377 A1    11/2019

*Primary Examiner* — Phuong H Nguyen
(74) *Attorney, Agent, or Firm* — Newport IP, LLC; Scott Y. Shigeta

(57) ABSTRACT

The techniques disclosed herein provide systems that can control the invocation of precision input mode. A system can initially utilize a first input device, such as a head-mounted display device monitoring the eye gaze direction of a user to control the location of an input target. When one or more predetermined input gestures are detected, the system can then invoke a precision mode that transitions the control of the input target from the first input device to a second input device. The second device can include another input device utilizing different input modalities, such as a sensor detecting one or more hand gestures of the user. The predetermined input gestures can include a fixation input gesture, voice commands, or other gestures that may include the use of a user's hands or head. By controlling the invocation of precision input mode using specific gestures, a system can mitigate device coordination issues.

20 Claims, 11 Drawing Sheets

(52) U.S. Cl.
CPC ............... *G02B 2027/0138* (2013.01); *G02B 2027/0187* (2013.01)

(56) References Cited

U.S. PATENT DOCUMENTS

| | | | |
|---|---|---|---|
| 2014/0104392 A1* | 4/2014 | Thorn | H04N 7/147 348/46 |
| 2016/0246384 A1* | 8/2016 | Mullins | G06F 3/017 |
| 2017/0235361 A1* | 8/2017 | Rigazio | G10L 15/22 715/710 |
| 2018/0288477 A1* | 10/2018 | Gupta | H04N 21/4532 |
| 2018/0314689 A1* | 11/2018 | Wang | G10L 15/1822 |
| 2019/0361521 A1 | 11/2019 | Stellmach et al. | |

\* cited by examiner

Detection of a threshold Level of Focus based on an overlap between the target and an object Detection of a threshold Level of Focus based on the position of the input target relative to a predefined region Detection of a threshold Level of Focus based a distance and/or velocity of the input target relative to an object or region Example scenario where the input data does not indicate a threshold level of focus

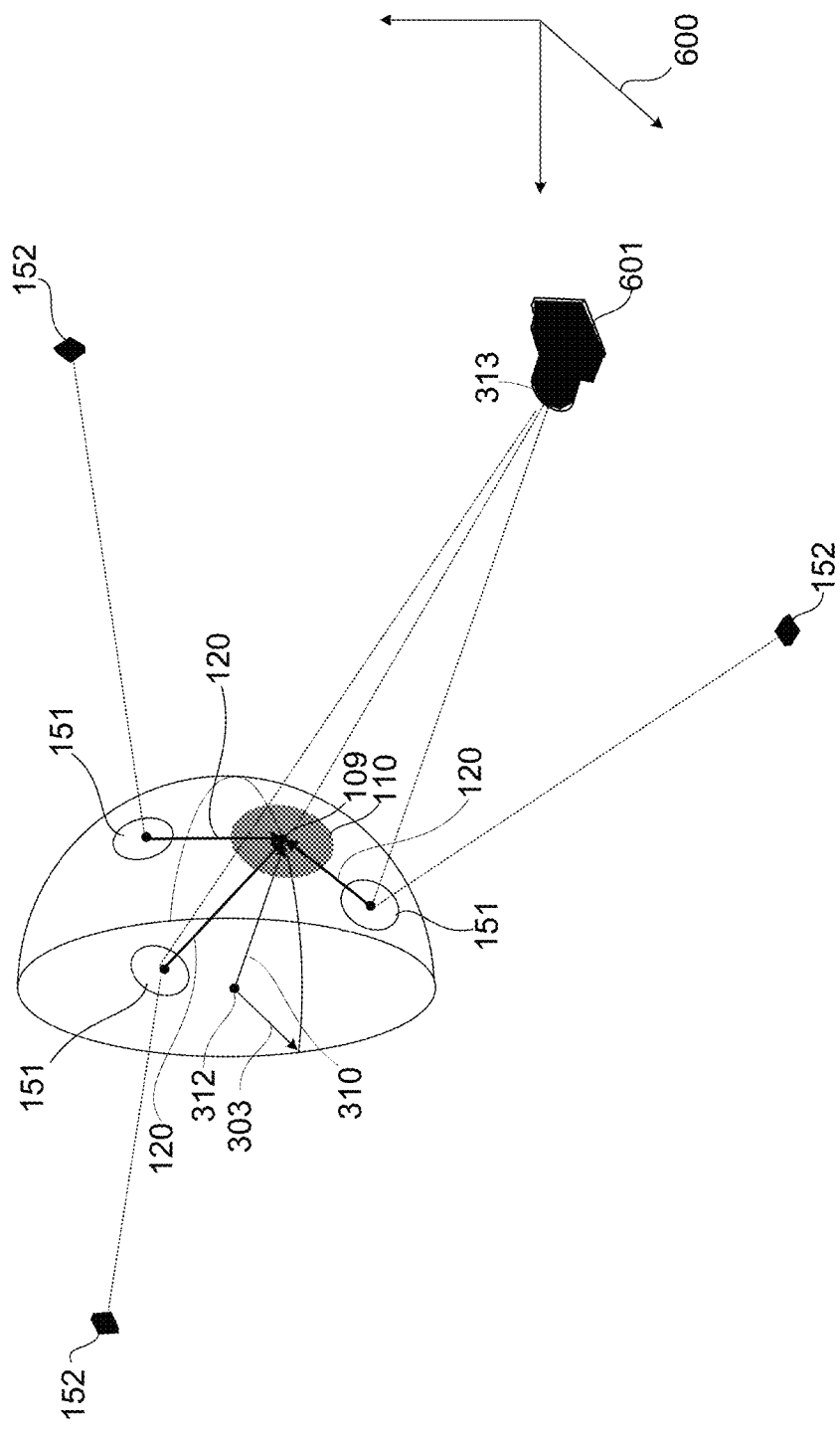

CONTROLLED INVOCATION OF A PRECISION INPUT MODE

BACKGROUND

User input devices for computers come in many different forms. For example, a computer can utilize a variety of input devices that can include the use of different input modalities that may include the interpretation of a user's voice or gestures performed by the user's hands, head, arms, eyes, etc. Some computers can use certain input devices to accommodate specific hardware capabilities. For instance, a desktop computer can use a mouse to select objects that are displayed on a screen and trigger different computing operations, while a head-mounted display device can use sensors to detect a user's eye movement and head movement to provide navigational controls for an augmented reality environment.

While there are a number of different types of devices that utilize different input modalities, some existing technologies present a number of drawbacks. For instance, some input devices are effective for targeting objects within a large field of view. However, such devices are less reliable for small targets, especially when the targets are positioned closely to one another.

To address such shortcomings, some devices utilize a combination of input devices and multiple input modalities. These designs require a system may have to coordinate different types of devices to allow a user to control the location of a particular input target. Although these designs can be helpful, they can often lead to input errors and user fatigue if the devices are not coordinated in an effective way. In some cases, systems that utilize multiple input modalities can inadvertently activate menus, erroneously select unwanted objects, or even erroneously trigger unwanted operations. Such errors can greatly disrupt a user's workflow and cause a number of inefficiencies in a computing system. In view of such issues, there is an ongoing need to further refine device designs that may utilize multiple input devices and multiple input modalities.

SUMMARY

The techniques disclosed herein provide computing devices that can control the invocation of a precision input mode. The invocation of the precision input mode can cause a device to transition the control an input target from a first input device to a second input device in response to the detection of one or more predetermined input gestures. For example, a system can initially utilize a first input device, such as a head-mounted display device monitoring the eye gaze direction of a user to control the location of an input target. The input target can be a pointer or cursor on a display screen or a pointer within a virtual reality environment or an augmented reality environment. When one or more predetermined input gestures are detected, the system can then invoke a precision mode that transitions the control of the input target from the first input device to a second input device. The second device can include another input device utilizing different input modalities, such as a sensor detecting one or more hand gestures of the user. In some configurations, the predetermined input gestures can include a fixation input gesture, voice commands, other gestures that may include the use of a user's hands or head, or various combinations thereof. By controlling the invocation of precision input mode using specific gestures, the system can provide the benefits of multiple input devices while also mitigating device coordination issues that can cause input errors and user fatigue. The techniques disclosed herein can also enable a system to be utilized in more effective ways by reducing the display of unwanted menus, reducing erroneously selected objects, or reducing erroneously triggered operations.

In one illustrative example, a system can initially use a first input device that can monitor a user's eye gaze input to direct a pointer to a specific location within a virtual environment or a real-world environment. The system can analyze input data from the first device to determine if the input data indicates a threshold fixation level, which is also referred to herein as a "threshold level of focus." As described in more detail below, a threshold fixation level can be based on eye movement of a user, a location or velocity of an input target, or the detection of other predetermined movements. The system can also analyze other input gestures from a second input device, such as a sensor interpreting a hand gesture or a head-movement gesture, to determine if an input from a second device meets one or more criteria. The input from the second device can meet one or more criteria in response to detecting a particular hand gesture using predetermined fingers, a head nod performed by the user, a voice command, etc. In response to determining that the secondary input from the second device meets one or more criteria, and in response to determining that the input data from the first device indicates a threshold fixation level, the system can invoke a precision mode. The precision mode can cause the system to decouple the control of an input target from the first input device and utilize the secondary input to control the location of the input target using the secondary device. The secondary input can be used to interact with objects viewed within a standard display screen, a virtual environment, or a real-world environment. For example, while in precision mode, the secondary input can be used to control a pointer or cursor, select graphical objects, select real-world objects, and trigger different computing operations.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 6 illustrates aspects of an eye model that can be used for detecting eye movement for invoking a precision mode.

DETAILED DESCRIPTION

Figure 1:
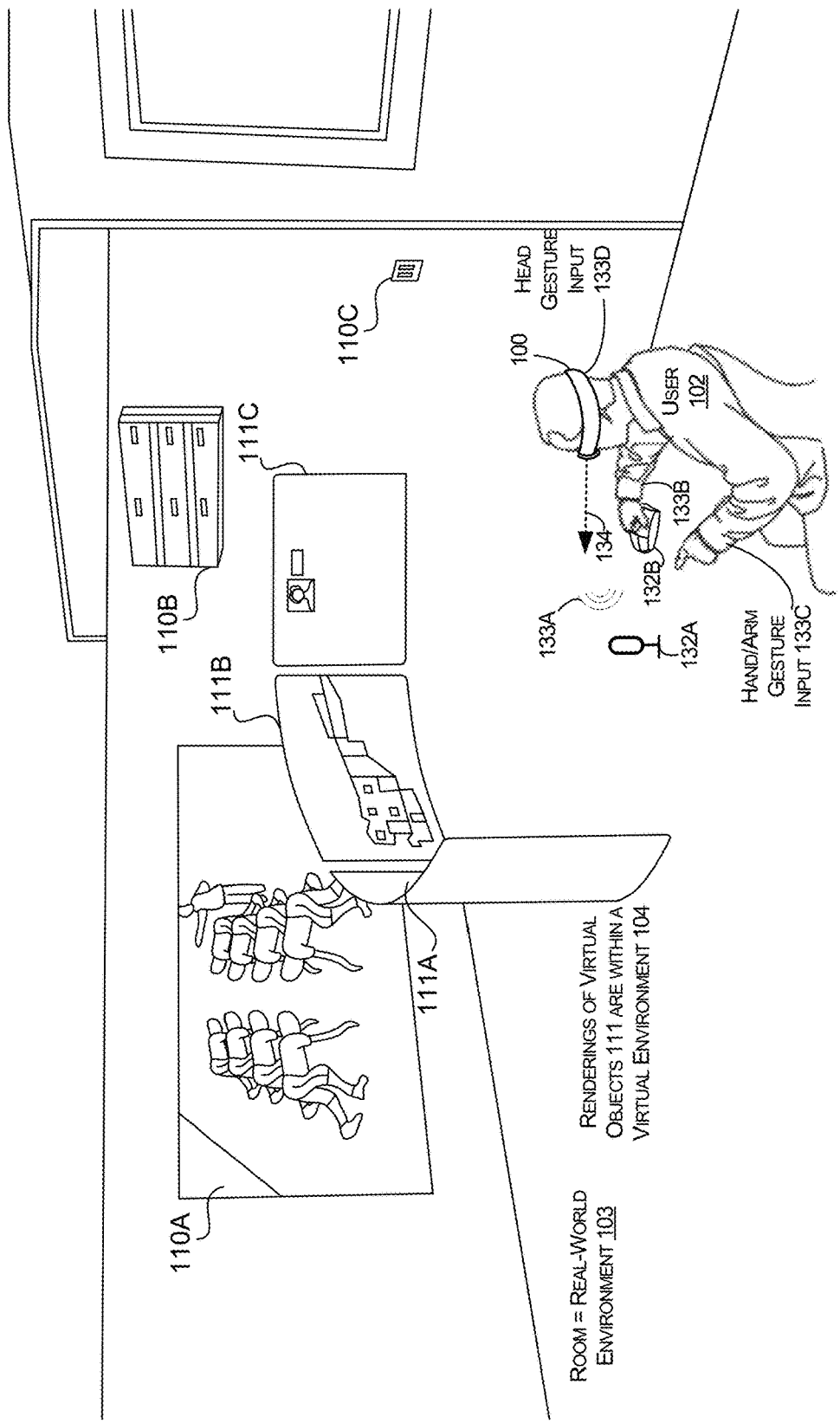
FIG. 1 illustrates an example scenario involving a computing device that may be utilized with the techniques disclosed herein.

FIG. 1 illustrates one example scenario involving a system 100 that may utilize with the techniques disclosed herein. In this example, the system 100 is in the form of head-mounted display (HMD) that is operated by a user 102. The system 100 and the user 102 can be located within a real-world environment 103, e.g., a room, office, etc. The real-world environment 103 can include real-world objects 110, such as a television 110A, a storage unit 110B, and a light switch 110C. The system 100 can be configured to interact with the real-world objects. For instance, the system can control the television and the light switch and obtain information regarding the contents of the storage unit. The system can also be configured to generate a virtual environment 104. The virtual environment 104 can be defined by a model of a three-dimensional space that can include virtual objects 111, such as a number of virtual display screens 111A-111C. The virtual environment 104 can be positioned within the real-world environment 103 to allow the virtual objects to augment the real-world objects.

The system 100 can also include a number of input devices 132 that can be utilized to monitor and interpret a number of gestures 133 that can be performed by the user 102. For instance, a microphone 132A can be utilized to monitor and interpret voice command 133A, a mouse 132B can be utilized to monitor and interpret and movements 133B, and one or more cameras can be utilized to monitor and interpret hand or arm gestures 133C. The system can also be configured with a number of sensors that can be utilized to interpret hand gestures 133D. The sensors or cameras of the system 100 can also be utilized to monitor eye movement of the user to generate data defining an eye gaze vector 134. The eye gaze vector 134 can be utilized to select objects the user is looking at. In addition, as described in more detail below, the eye gaze vector 134 can be utilized to determine a fixation level, which is also referred to herein as a fixation level. These examples are provided for illustrative purposes and are not to be construed as limiting. It can be appreciated that other types of sensors and input devices can be utilized with the techniques disclosed herein.

Figure 2:
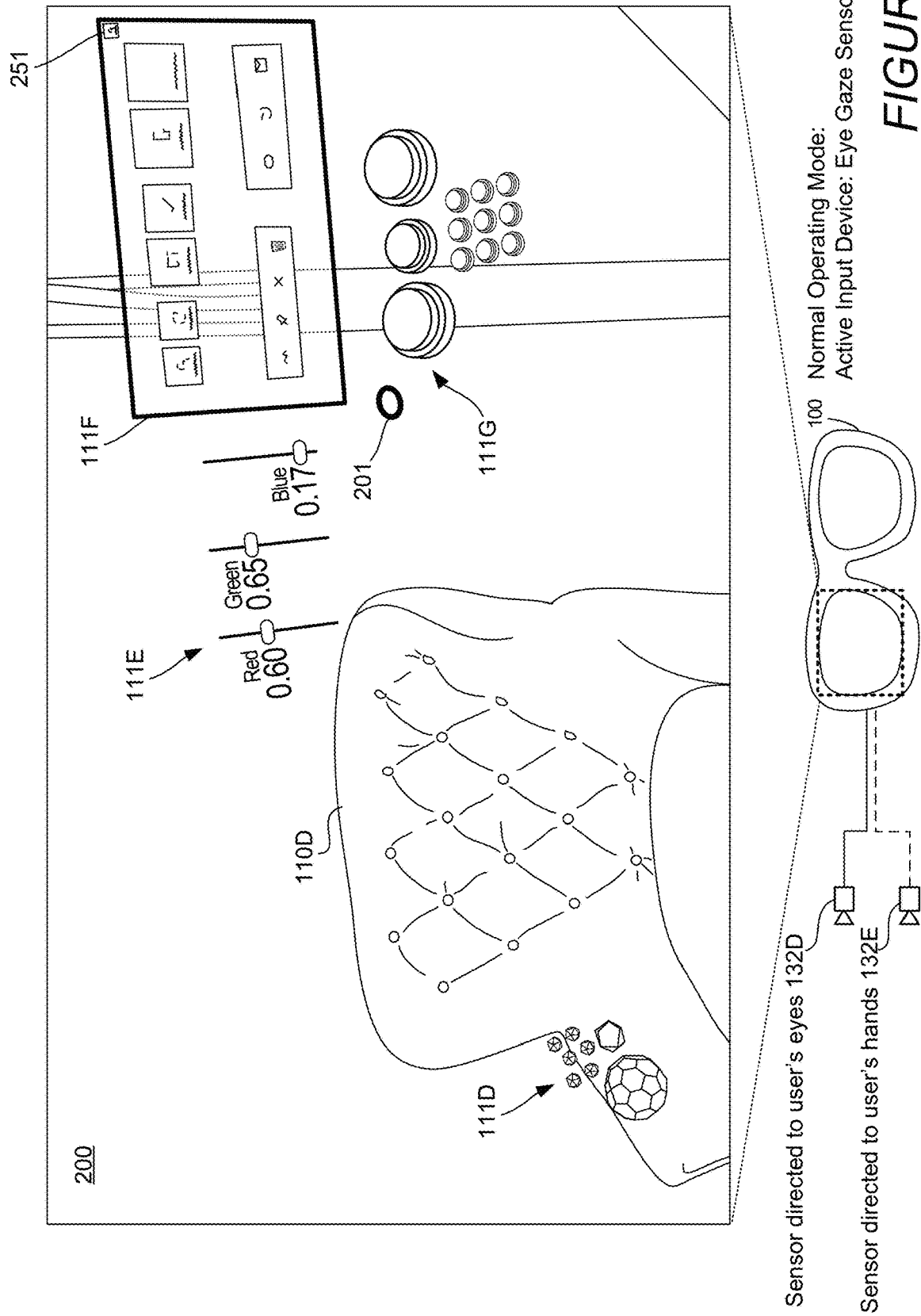
FIG. 2 illustrates an example scenario involving a computing device operating in a first operating mode utilizing a first input device to control an input target.
Figure 3:
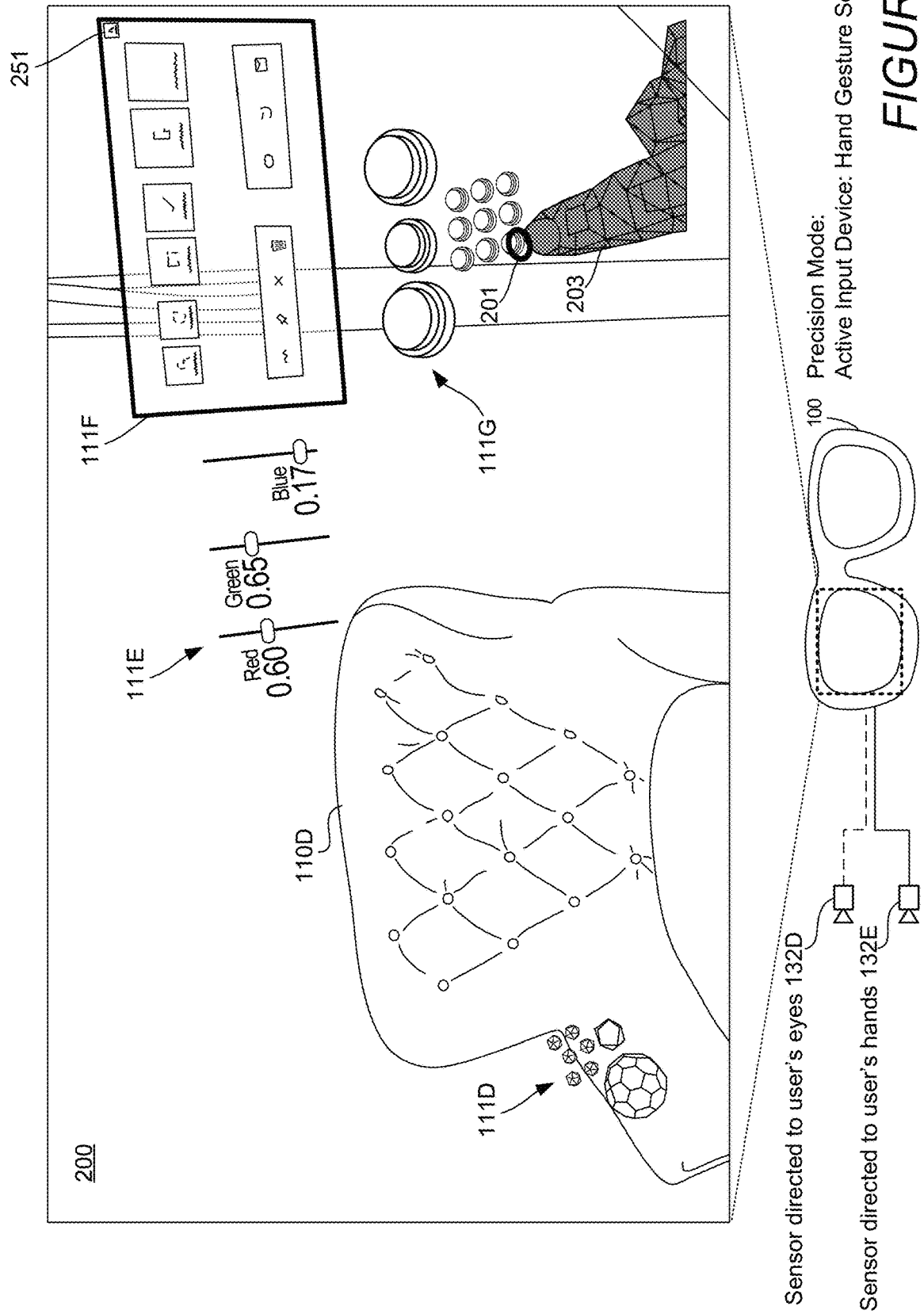
FIG. 3 illustrates an example scenario involving a computing device operating in a precision operating mode utilizing a second input device to control an input target.

FIG. 2 and FIG. 3 illustrate aspects of an example scenario involving a controlled invocation of a precision mode of a system 100. This example is illustrated from a view 200 from the perspective of an HMD screen. This example shows a scenario where the system transitions the control of a target 201 from a first input device 132D to a second input device 132E. In this example, the first input device can include one or more sensors for detecting the direction of the user's eye gaze and the second input device can include one or more sensors for detecting the user's hand gestures. In response to detecting one or more predetermined input gestures, the system 100 can decouple the control of the target 201 from the first input device and enable the second input device to control the location of the target 201. This example is provided for illustrative purposes and is not to be construed as limiting. It can be appreciated that the input devices can be in other forms and utilize other input modalities. For illustrative purposes, the target 201 is also referred to herein as As shown in FIG. 2, this example scenario involves a view of a real-world environment, e.g., a room, that includes real-world objects 110, such as a chair 110D. The system 100 can also be configured to overlay a computer-generated rendering over the view of the real-world environment. The rendering can include virtual objects 111 that can be positioned to augment the real-world objects 110. In this example, a first set of virtual objects 111D that includes a set of movable orbs, a second set of virtual objects 111E that includes a number of slide bar controllers that control display properties, a third set of virtual objects 111F that includes a set of selectable menu items, and a fourth set of virtual objects 111G that includes a set of three-dimensional buttons. As shown, some of the virtual objects are larger than others. Also shown, some of the virtual objects are spaced closer to one another versus the other objects. For instance, the set of three-dimensional buttons include nine small buttons that are arranged close to one another, while the slide bar controllers are spaced further apart.

While in a normal operating mode, the system utilizes the first input device to track the user's eye movement to control the location of the input target 201. User eye gestures can cause the first input device to move the input target 201 to specific locations within the view 200. The user's eye movement can also cause the system to select objects, move virtual objects, or cause the system to execute computer operations by interacting with certain virtual objects. The user's eye movement can also cause the system to interact with real-world objects using the input target. Interactions with the real-world objects can include the selection of a real-world object or the execution of computer operations associated with a particular real-world object, e.g., changing the state of a smart light switch.

Although the system can select objects that are displayed within the view 200 by the use of a first input device configured to monitor the eye gaze of a user, as described above, such input modalities can have certain pros and cons. For instance, some objects may be easier to select because the size of the object and relative spacing from other objects. However, smaller objects, or objects that are positioned closer to one another, such as the nine 3D buttons, may be difficult to select or activate. To address this issue, the system can invoke the precision mode in response to the detection of one or more predetermined gestures.

A predetermined gesture for causing the system to invoke the precision mode can include a user gesture such as a head nod, a specific hand gesture, or any other gesture, including a voice command. A predetermined gesture can also include user actions that indicate that the user has a threshold fixation level with respect to a specific region within the view 200. A predetermined gesture can also include user actions that indicate that the user has a threshold fixation level with respect to a specific object within the view 200. In addition, the system can also invoke the precision mode in response to any combination of predetermined gestures. For instance, system can invoke the precision mode to transition the control of an input target from a first input device to a second input device in response to (1) determining that a user gesture indicates that the user has a threshold fixation level and (2) determining that the user has provided a second predetermined gesture. The second predetermined gesture can include, for example, a voice command, performed a head nod, or performed a specific hand gesture. For the voice commands, the system may be configured to invoke precision mode in response to statements indicating an intent to invoke precision mode, such as "start precision mode."

As shown in FIG. 3, while the system is in precision mode, the system controls the location of the input target according to the user gestures that are interpreted by the second input device. In this particular example, the second input device interprets the user's hand movement to control the location of the input target. In addition, while the system is in precision mode, the first input device is decoupled from the control of the input target. In some embodiments, while in precision mode, a graphical representation 203 of the user's input action, such as computer-generated representation of the user's hand, can be displayed.

One illustrative example of a predetermined gesture for invoking the precision mode can include a pinch gesture that is performed by the user. Thus, in response to detecting that a user has performed a pinch gesture, the system can invoke the precision mode. Such predetermined gestures can also include additional criteria for invoking the precision mode. For instance, a predetermined gesture can include a pinch gesture that is performed with specific fingers, such as a user's thumb and middle finger. This example is provided for illustrative purposes and is not to be construed as limiting. It can be appreciated that any predetermined gesture that is performed by a specific set of fingers can also include other combinations of figures such as the user's thumb and ring finger, the user's thumb and the index finger, etc.

In other examples, a system can define predetermined gestures can include other criteria that are required for causing a system to invoke the precision mode. This can include pinch gestures that are performed at a particular velocity. In one specific embodiment, a pinch gesture that involves the use of two fingers that move towards one another at a velocity less than a threshold velocity can be utilized by the system to invoke the precision mode. This embodiment is referred to herein as the "slow pinch." Thus, when the user performs a pinch gesture where the user moves two fingers towards one another at a velocity that is greater than the threshold velocity, the system does not invoke the precision mode. This feature can also be combined with a specific combination of fingers, such as the use of the user's index finger and thumb. Thus, when the user performs the pinch gesture using the predetermined fingers, such as the thumb and index finger, or the thumb and the middle finger, wherein the two predetermined fingers move towards one another at a velocity less than a threshold velocity, the system can invoke the precision mode. If the two predetermined fingers move towards one another at a velocity that is greater than the threshold velocity, the system does not invoke the precision mode.

In another example, a predetermined gesture can include a head nod. Such a gesture can be interpreted by an input device such as a camera, accelerometer, or one or more inertial sensors that can be utilized to detect head movement of the user. A predetermined gesture can include a specific head nod that includes vertical movement of a designated point on the user's head. The system can invoke the precision mode, for example, when vertical movement of a user's nose or chin exceeds a threshold distance. In yet another example, the system can invoke the precision mode when vertical movement of a user's head exceeds a threshold distance and when horizontal movement of the user's face does not exceed a threshold distance, e.g., the movement has more vertical motion than side-to-side motion. A predetermined gesture can also be detected by a measurement of rotation of any point of the user's head. In such embodiments, the system can invoke the precision mode when a detected rotation exceeds a rotation threshold.

In other examples, a predetermined gesture can include remote touch-based or controller-based cursor refinement. The user can tap on a touch-sensitive surface and maintain the tap (hold gesture) to invoke a cursor or where the user is looking. Other touch gestures or an explicit mode change via a button on the phone screen are possible as well. From there, the user can refine the signal by moving their finger on the touch-sensitive surface. Thus, the system may use the gaze input in regular operating mode, then use the touch pad in precision mode. This can apply to any controller including a mouse, trackpad, etc. For instance, the user can invoke the precision mode cursor by holding down a button on a motion controller and adapting the cursor position based on the controller movement.

In yet another example, gestures performed on a phone that paired with a headset can be performed to invoke the precision mode. For example, a user can perform a "long press" gesture on a phone user interface. This can include any type of input gesture, such as a touch gesture, that is held for at least a predetermined period of time. In response to detecting that a touch gesture is held for at least a predetermined period of time, system can allow the user to precise movements in a secondary device such as a head-mounted display, e.g., a headset. In any of the embodiments disclosed herein, the system can exit the precision mode based on a secondary type of input or after a timeout period. The secondary type of input can be a voice command, e.g., "exit precision mode," or a second long touch gesture on the phone user interface. The timeout period may be measured from a time that the precision mode has started. If the device does not receive an input from the secondary device within the timeout period, such as the headset, the system may exit the precision mode.

In some embodiments, the precision mode can be activated based on an input received on a user interface. For example, as shown in FIG. 2 and FIG. 3, one of the user interface menus 111F can include an interface element 251 that can be configured to invoke the precision mode when activated. This interface element can include text or provide other visual indicators that describe the functionality of the precision mode. A user can use the first input device to actuate such interface elements. In addition, the user can provide a second input to the interface element 251 to exit the precision mode.

The detection of a predetermined gesture can also include the detection of a threshold fixation level of a user. In some embodiments, a system can determine a fixation level based on measurements with respect to the position, velocity, and/or direction of movement of the input target. In the example shown in FIG. 4A, the system may determine that the user has a threshold fixation level when the input target is directed to, or directed near, a specific object or a set of objects, such as the set of 3D buttons. In one specific example, when the user's eye gaze is fixated on, or around, the smaller 3D buttons for a predetermined time period, the system may detect a threshold fixation level.

Figure 4A:
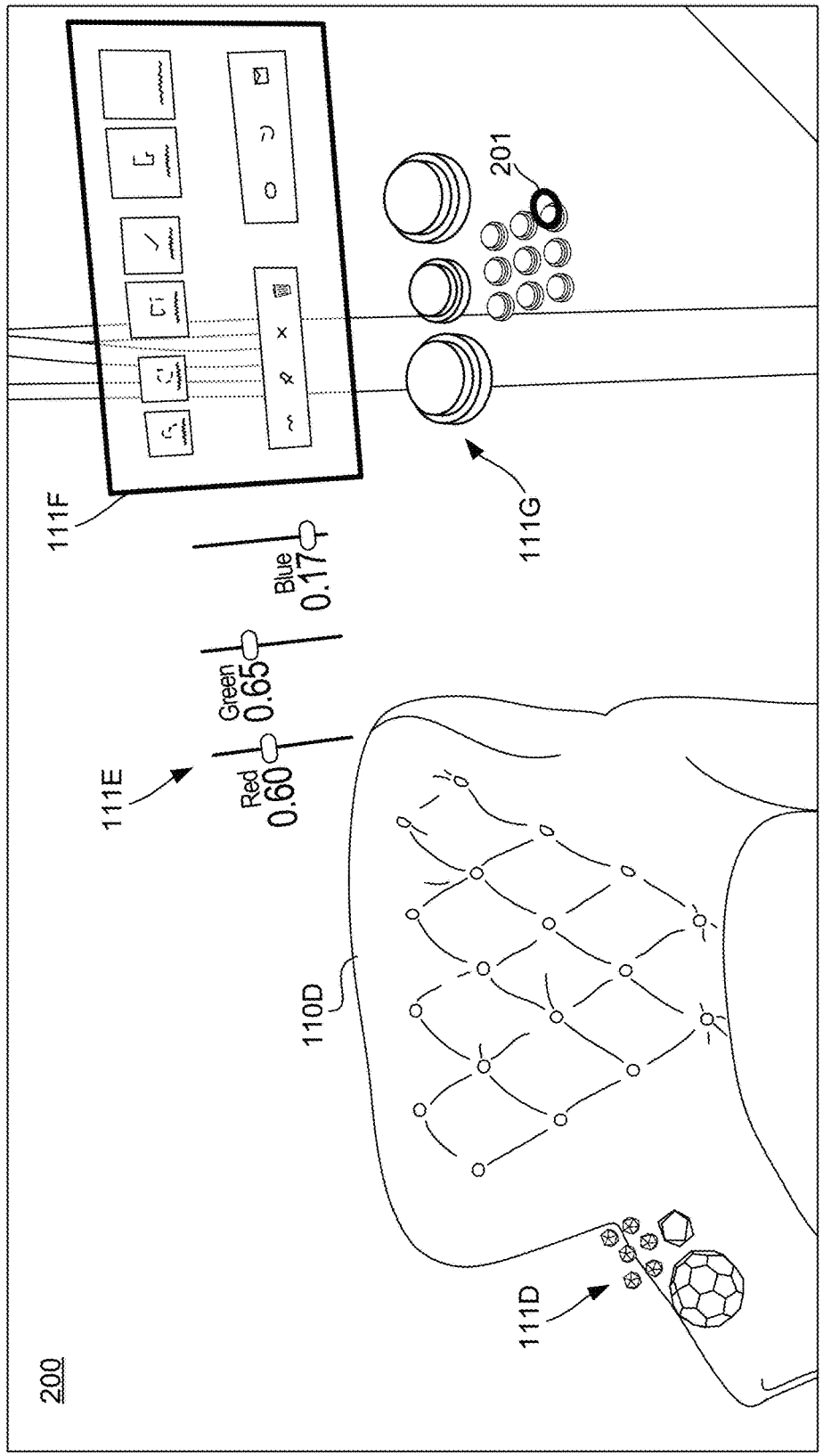
FIG. 4A illustrates an example user interface of a device that is receiving an input to select a user interface element.

This feature can utilize of a number of different measurements for determining a fixation level and then determining if the detected fixation level exceeds a threshold. For instance, a threshold fixation level can be determined if the input target 201 overlaps a particular object. The system can require a full overlap, a partial overlap, or an overlap by a predetermined amount. Thus, a threshold fixation level can be determined if the input target 201 has a threshold level of overlap with a particular object. This can include a particular implementation where a graphical representation of an input target has a predetermined shape, such as a circle or oval, with a predetermined size. When the graphical representation of the input target has a threshold level of overlap with an object, the system can invoke the precision mode. This feature can include the overlap of a single object, or a group of objects. In the example of FIG. 4A, if the input target overlaps at least one of the buttons of the cluster of 3D buttons, the system can determine that the user's input gesture meets or exceeds a threshold fixation level.

Figure 4B:
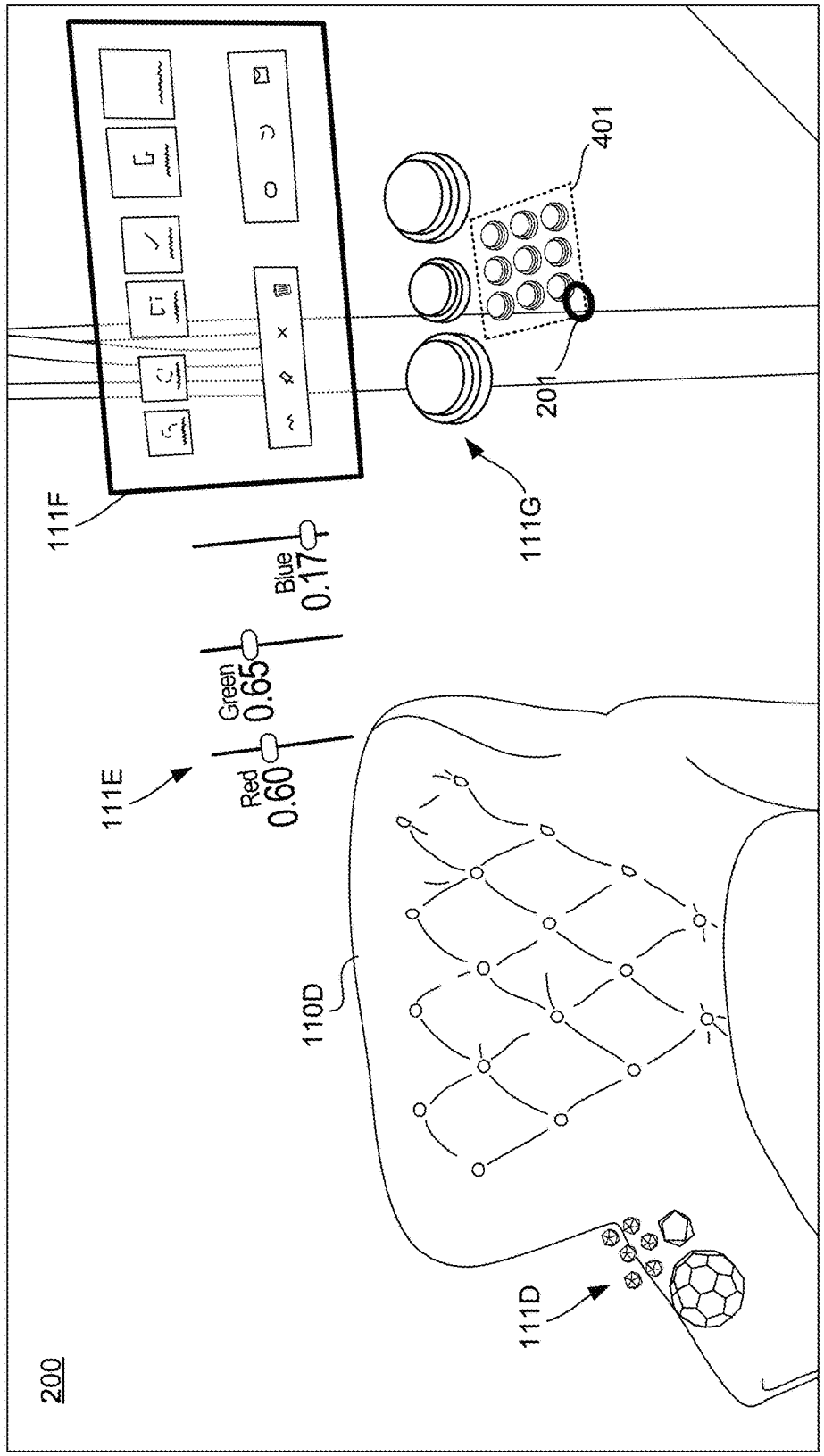
FIG. 4B illustrates an example user interface of a device that is receiving an input to select a user interface element within a region.

In some embodiments, as shown in FIG. 4B, a system can determine a fixation level by monitoring the position of the input target relative to a predefined region 401. In this example, the user's input may be interpreted as having a threshold fixation level when the input target is within a predefined region 401 of the viewing area 200. The predefined region 402 can be positioned and shaped around, or in proximity to, specific objects, such as the smaller set of 3D buttons, a real-world light switch, etc. When the user's eye gaze is used to direct an input target to be located within the predefined region 401, the system can determine that the user input indicates a threshold fixation level. In one specific example, when the input target is within the predefined region 401 for a predetermined time period, the system can determine that the user input indicates a threshold fixation level.

Figure 5A:
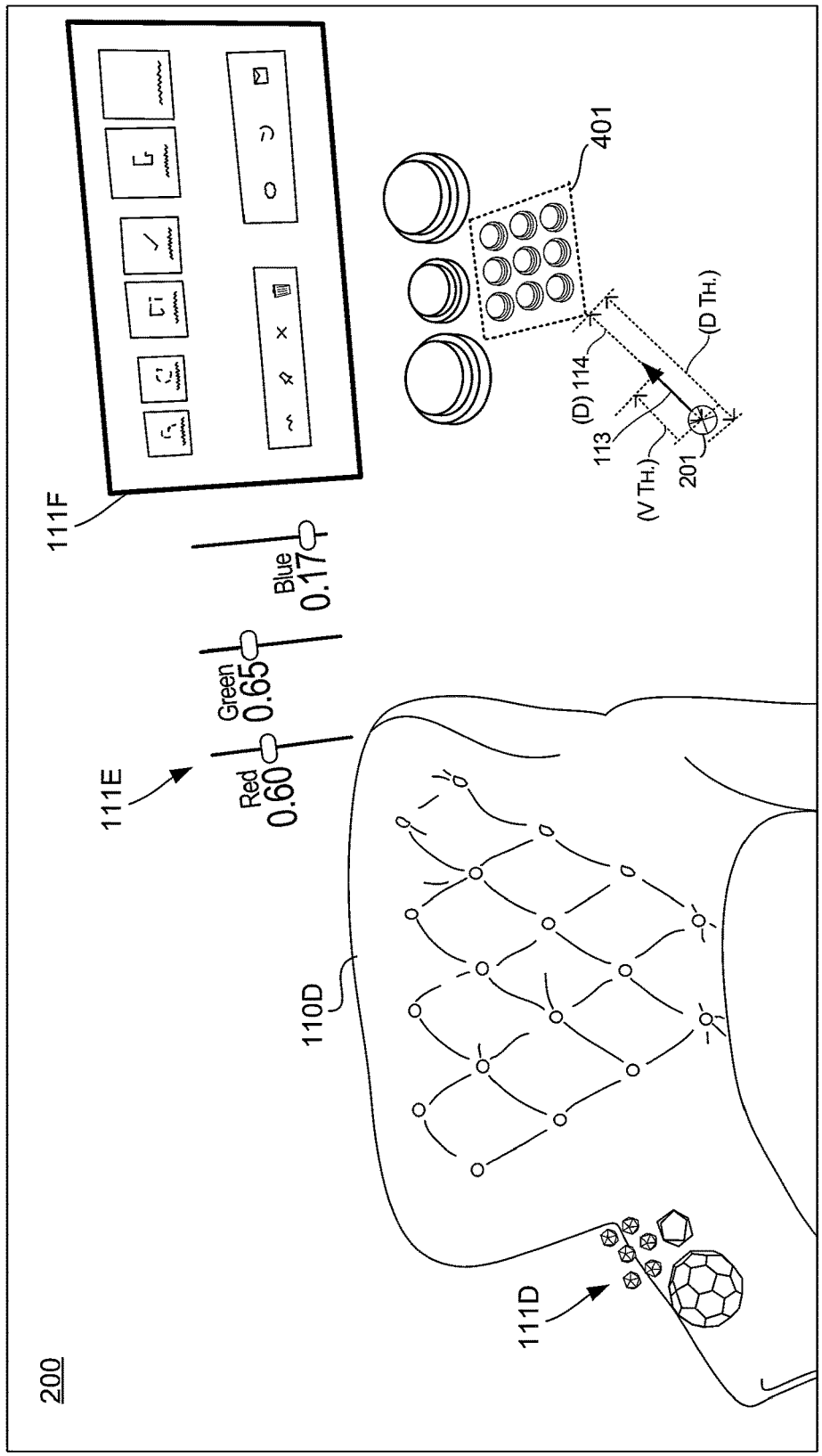
FIG. 5A illustrates an example user interface of a device that is receiving an input to invoke a precision mode based on specific gestures.

In some embodiments, the system can utilize the position, velocity, and direction of movement of the input target to determine when an input indicates a threshold fixation level. One example of such an embodiment is shown in FIG. 5A. In this example, a position, direction, and/or velocity of the input target 201 are compared to one or more criteria. In response to determining that the position and/or velocity of the input target 201 meets the one or more criteria, the system determines that the input indicates a threshold fixation level.

To illustrate aspects of this embodiment, consider a scenario where the input target is at a distance (D) 114 from the region 401. In addition, input data from the first input device indicates that the input target 201 is moving towards the region at a given velocity, as shown by the movement vector 113. In this example, the input target is moving towards the detection area with a velocity that is greater than a velocity threshold (V. Th.). In addition, the distance between the input target and the region is less than a distance threshold (D. Th.). Given these parameters generated from the input data, the system can determine that the input indicates a threshold fixation level. Thus, when the input target is within a threshold distance to the region or the object, moving toward the region, and the velocity of the input target is above a threshold, the system can determine that the user input indicates intent to focus on the region or the objects associated with the region.

Figure 5B:
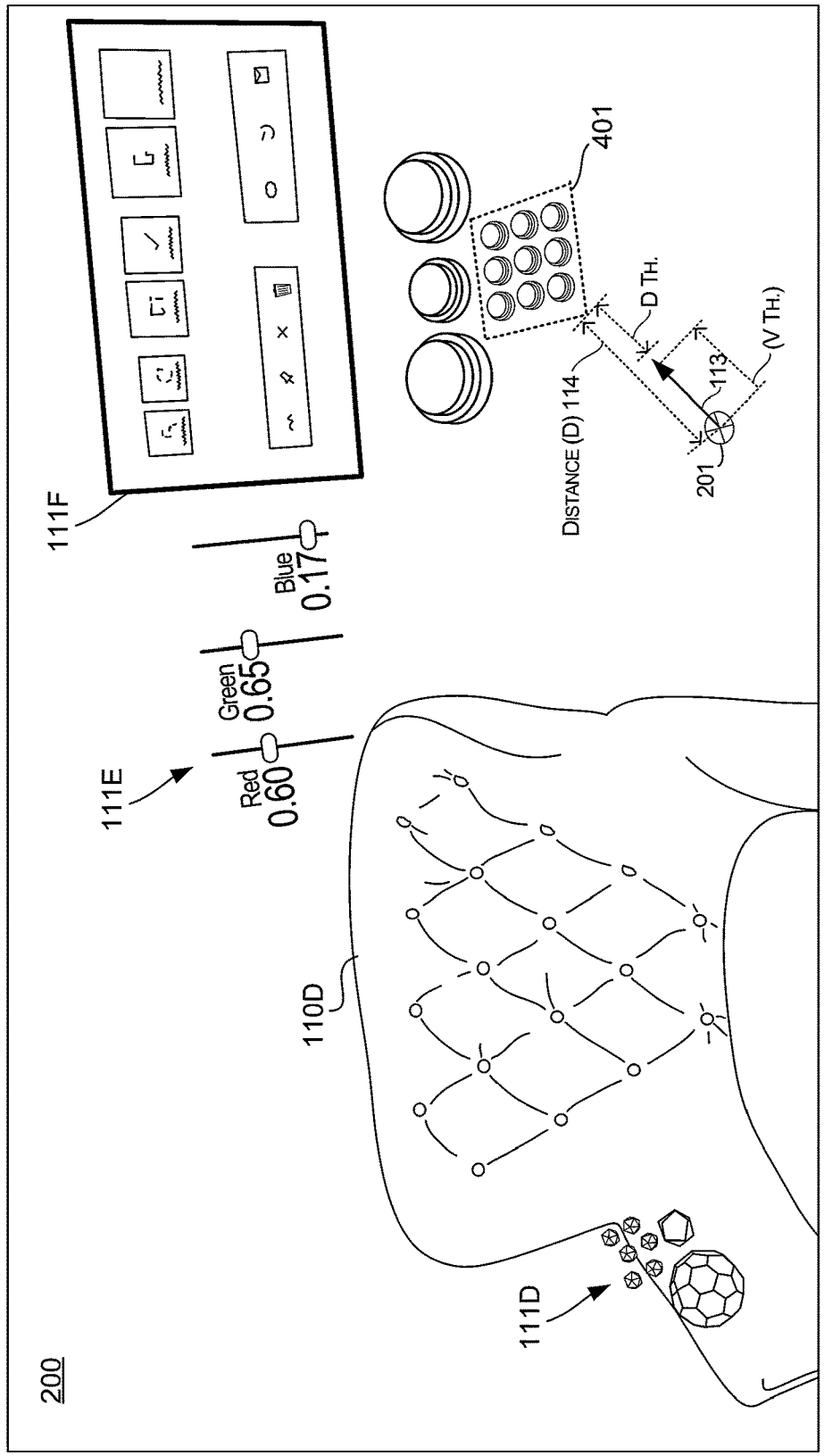
FIG. 5B illustrates an example user interface of a device that is receiving an input to restrict the invocation of a precision mode based on other specific gestures.

As shown in FIG. 5B, when the system can determine that the input does not indicate a threshold fixation level when one or more criteria is not met. In this example, the distance (D) between the input target 201 and an object is not within the threshold distance. Thus, although the direction of the input target is moving toward the region, and the velocity exceeds a threshold velocity, the system can determine that the input does not indicate a threshold fixation level. Although this example involves an embodiment where the distance (D) of the input target is relative to the region, it can be appreciated that the distance (D) can be measured relative to one or more objects, such as the 3D buttons.

In some configurations, the system can analyze a user's eye movement to determine when the user input indicates a threshold fixation level. In such embodiments, the system can utilize a number of different measurements and criteria to determine when a threshold fixation level is achieved. For instance, the system can monitor the angular rotation of a user's eye and/or the position of one or more ocular features, such as a pupil point, and determine that a threshold fixation level is achieved when these measurements meet one or more criteria. In general, when the eye movement is limited, e.g., the eye is stationary or has limited movement, the system can determine that the user input indicates a threshold fixation level. In some embodiments, when the user's eye movement does not one or more thresholds, e.g., the eye movement does not exceed a threshold angular rotation with a given time period and/or if the eye movement does not exceed a threshold velocity, the system can determine that an input indicates a threshold fixation level, and the invokes the precision mode for causing a second input device to control an input target. Thus, the movement of the eye can be measured by a rate of angular rotation or a velocity of an ocular feature, such as a pupil point or a glint.

Once in precision mode, the system can also transition back to a regular operating mode from the precision mode when the user's eye movement exceeds one or more thresholds. This transition can occur when a user's eye movement exceeds a threshold angular rotation and/or if the eye movement exceeds a threshold velocity. When the system transitions back to a regular operating mode from the precision mode, the system can cause the first input device to control an input target and decouple the second input device from the control of the input target.

As shown in FIG. 6, the system can use one or more measurements of a user's eye to determine if an input indicates a threshold fixation level. As shown, a number of measurements can be used to determine estimates of a user's eye, and the estimates can be used to determine a position and angular velocity of a user's eye. In this example, one or more sensors, such as a camera 601 can determine the position of the ocular features, such as a pupil 110 and one or more glints 151 that may be a caused by a reflection from one or more light sources 152. The system can then generate biological estimation data defining biological parameters. The biological parameters can include any parameter that describes, quantifies or identifies a feature of the eye. For example, a biological parameter can include an orientation, position, or shape of the eye. The orientation and the position of the eye can be estimated based on the position

108 of the plurality of glints 151 and the pupil position 109 of the pupil 110. The estimation can include the use of a model that can define a number of vectors 120 between each ocular feature as well as other measurements such as the radius 303 of the eye, etc. The orientation 310 and a position 312 of the eye can be defined by any data value, such as a coordinate or vector, suitable for indicating a direction and/or location relative to a coordinate system 600. This example of generating measurements and estimates for determining an eye position is provided for illustrative purposes and is not to be construed as limiting. It can be appreciated that other types of sensors and input devices can be utilized to measure an orientation and position of a user's eye.

Figure 7:
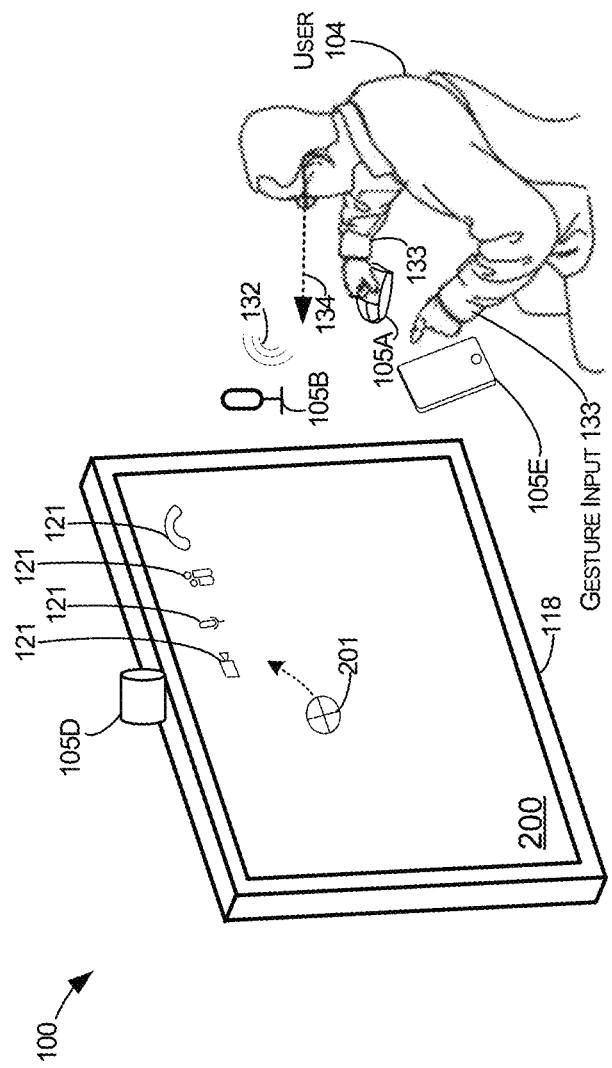
FIG. 7 illustrates another example of an operating environment involving a flatscreen working with multiple input devices that can utilize a precision mode that is invoked by specific gestures.

Although the examples disclosed herein describe embodiments using a virtual reality or augmented reality environments, the techniques disclosed herein can apply to other operating environments. For instance, as shown in FIG. 7, the techniques for controlling the invocation of a precision mode can also apply to view of a 2D display screen 118 that is in communication with a computing device, such as a desktop computer. Such systems can also detect input gestures using a number of input devices 105 that may utilize a number of different input modalities, e.g., touch inputs, hand gestures, head gestures, voice commands, etc. In this example, the input target 201 can be controlled by a first device, such as a camera 105D, that is tracking the user's eye movement. The target can be used to select one or more user interface controls 121 on the display screen. When the system 100 detects that the user has a threshold fixation level, and in response to a second input gesture, such as a slow pinch or a pinch gesture performed with specific fingers, the system can transition to a precision mode. In this example, invocation of the precision mode can cause the system to use a different input device. However, in some embodiments, invocation of the precision mode can cause the system to utilize the same input device, such as the camera 105D for tracking a user's eye movement, that was used in regular operating mode. In such embodiments, once in precision mode, the system may use the camera 105D to capture the user's hand gesture allowing the system to utilize an input using a different input modality, e.g., hand gestures. As described herein, a phone 105E can also function as an input device, which may be used to invoke precision mode and/or also function as a secondary device for providing precision inputs to guide a cursor or input target once the system is in precision mode.

Figure 8:
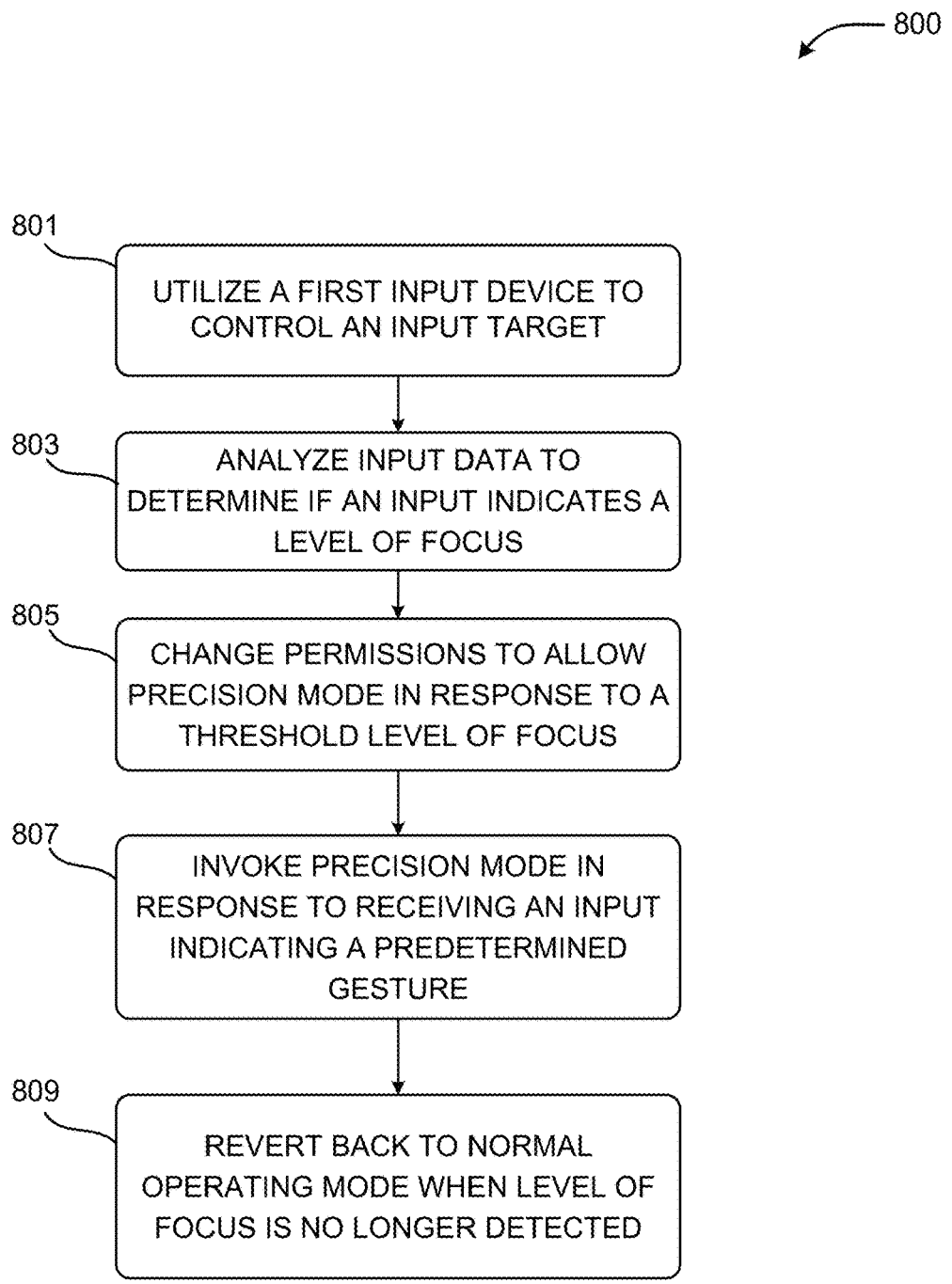
FIG. 8 is a flow diagram showing aspects of a routine for invoking a precision mode of a device.

Turning now to FIG. 8, aspects of a routine 800 for controlling the invocation of a precision mode are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 800 are described herein as being implemented, at least in part, by an application, component and/or circuit, such as a device module 915 that can be included in any one of the memory components disclosed herein, including but not limited to RAM 914. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may be also implemented in many other ways. For example, the routine may be implemented, at least in part, by a processor of another remote computer or a local circuit. In addition, one or more of the operations of the routine may alternatively or additionally be implemented, at least in part, by a chipset working alone or in conjunction with other software modules. Any service, circuit or application suitable for providing input data indicating the position or state of any device may be used in operations described herein.

With reference to FIG. 8, the routine 800 can begin at operation 801, where the device 100 utilizes a first input device and a first modality to control an input target. This can include sensors such as a camera to track the movement of a user's eyes for controlling an input target, such as a cursor or pointer. Input data from the first input device defines an eye gaze direction. The input data can include image data depicting an image of an eye, and the analysis of the image data can be used to determine a gaze vector with point of origin and direction. The input data can also define parameters of a gaze vector. The eye movement can cause the device to control the location of an input target, e.g., a pointer, cursor, etc.

For illustrative purposes, the "viewing area" can include a view of content rendered on a display screen, such as the view of content displayed on the monitor 118 of FIG. 7. The viewing area can also include a view of a virtual environment or an augmented environment displayed through a near-to-eye display screen such as the example of FIGS. 1, 2, and 3. Such near-to-eye display screens can include a semi-transparent display screen for allowing computer generated renderings to be positioned over a view of a real-world environment, e.g., for providing an augmented environment. In other embodiments, the near-to-eye display screens can include a non-transparent display screen for allowing computer generated renderings to be positioned within a three-dimensional model, e.g., for providing a virtual reality environment. An input target can be defined by data indicating a location within a viewing area. The input target can be visible to the user, e.g., such as graphical input target shown in FIG. 2, a cursor, etc.

For illustrative purposes, an "input target" is defined as a graphical element that shows a location for a cursor or a pointer. The location for a cursor or a pointer is referred to herein as a "pointer location." The input target can be associated with input data that defines a specific location within a 2D or 3D environment, which can include coordinates of a point in a 2D or 3D environment. Some embodiments may not continuously display a graphical element showing the pointer location. In such embodiments, the system may provide other graphical indicators to intermittently show the pointer location. For example, when a user provides an input defining a pointer location, and the input target overlaps a real-world object, such as a smart light switch, the system may generate a graphical indicator that brings highlight to the smart light switch.

At operation 803, the system can analyze input data to determine if an input indicates a threshold fixation level. This can include any of the techniques disclosed herein including but not limited to techniques for monitoring a user's eye movement and techniques for monitoring the position, velocity, and direction of an input target relative to a region or an object. The objects disclosed herein can refer to both the real-world objects and virtual objects. Determining a "threshold fixation level" can include determining a value for a fixation level and then comparing that value to a threshold value. If the fixation level exceeds or meets some criteria relative to the threshold value, e.g., that that fixation level value is greater than the threshold value, the system can change permissions to allow the system to invoke the precision mode. The system may also invoke the precision mode in response to detecting a threshold fixation level without requiring the detection of a separate triggering gesture.

At operation 805, the system can change permissions to allow precision mode to be invoked in response to the detection of a threshold fixation level. The permissions can be configured to restrict the invocation of the precision mode when the system is operating in regular operating mode. Then, when the system detects a threshold fixation level, the device changes the permissions to allow the invocation of the precision mode. For illustrative purposes, a threshold fixation level can be determined by generating a value for a fixation level and comparing that value to a threshold. If the value exceeds the threshold the system can determine a detection of a threshold fixation level.

At operation 807, the system can invoke precision mode in response to receiving an input indicating a predetermined gesture. This can include a particular hand gesture, a head nod, a voice command, etc. In some embodiments, some predetermined gestures can only cause the invocation of the precision mode when the permissions are configured to allow the invocation of the precision mode. Such embodiments can mitigate an unwanted state change of the device, e.g., particularly when a person is not focusing or fixating on a particular object, region, or a set of objects.

In some embodiments, some predetermined gestures can cause the system to override the permissions and invoke the precision mode regardless of the state of the permissions. For instance, a slow pinch gesture or a pinch gesture using certain fingers can cause the system to invoke the precision mode regardless of the state of the permissions.

At operation 809, the system can revert back to normal operating mode from the precision mode when a threshold fixation level is no longer detected. This can involve changing the permissions back to a state where the permissions cause the system to restrict the invocation of the precision mode. Any of the embodiments disclosed herein can involve a transition from the precision mode back to a regular operating mode any time a criteria for invoking the precision mode is no longer met. For instance, if a system is configured to invoke the precision mode based on the detection of a threshold fixation level, e.g., a gaze direction overlapping with an object for a predetermined time, the system can transition back to a regular operating mode if the system no longer detects the threshold fixation level, e.g., that the gaze direction no longer overlaps with the object. In addition, a system can transition back from the precision mode to a regular operating mode in response to a predetermined gesture, such as voice command, a reverse pinch gesture, or another predetermined hand gesture. When the system transitions back to a regular operating mode, the system enables the first input device to control of an input target, and the system decouples the second input device from the input target.

Figure 9:
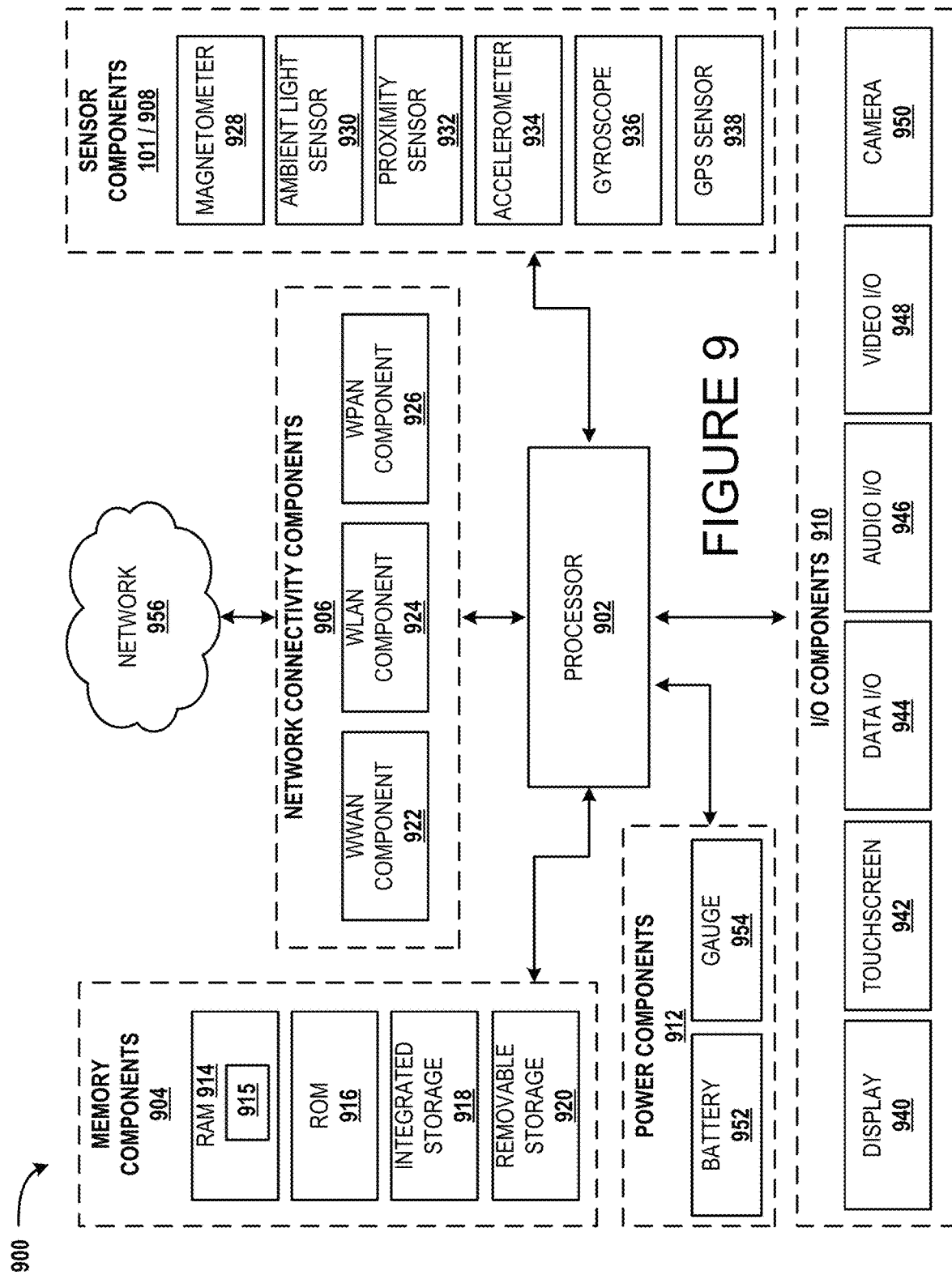
FIG. 9 is a computer architecture diagram illustrating an illustrative computer hardware and software architecture for a computing system capable of implementing aspects of the techniques and technologies presented herein.

Turning now to FIG. 9, an illustrative computing device architecture 900 for a computing device that is capable of executing various software components described herein. The computing device can be a head-mounted display unit, which is also referred to herein as a headset. The computing device architecture 900 is applicable to computing devices that facilitate mobile computing due, in part, to form factor, wireless connectivity, and/or battery-powered operation. The computing device architecture 900 can be the architecture of the device 100 of FIG. 1. In some configurations, the computing devices include, but are not limited to, a near-to-eye display device, e.g., glasses or a head mounted display unit. The computing device architecture 900 can also apply to any other device that may use or implement parts of the present disclosure, including, but not limited to, mobile telephones, tablet devices, slate devices, portable video game devices, and the like. Moreover, aspects of the computing device architecture 900 may be applicable to traditional desktop computers, portable computers (e.g., laptops, notebooks, ultra-portables, and netbooks), server computers, and other computer systems, such as those described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 900 illustrated in FIG. 9 includes a processor 902, memory components 904, network connectivity components 906, sensor components 908, input/output components 912, and power components 912. In the illustrated configuration, the processor 902 is in communication with the memory components 904, the network connectivity components 906, the sensor components 908, the input/output ("I/O") components 910, and the power components 912. Although no connections are shown between the individuals components illustrated in FIG. 9, the components can interact to carry out device functions. In some configurations, the components are arranged so as to communicate via one or more busses (represented by one or more lines between the components).

The memory components 904 is connected to the CPU 902 through a mass storage controller (not shown) and a bus. The memory components 904 and its associated computer-readable media provide non-volatile storage for the computer architecture 900. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, the computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes the claims, the phrase "computer storage medium," "computer-readable storage medium," "non-transitory computer storage media" and variations thereof, does not include waves, signals, and/or other transitory and/or intangible communication media, per se.

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, a touch-enabled input.

In some configurations, the processor 902 includes a graphics processing unit ("GPU") configured to accelerate operations performed by the CPU, including, but not limited to, operations performed by executing general-purpose scientific and/or engineering computing applications, as well as graphics-intensive computing applications such as high-resolution video (e.g., 720P, 1030P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein the sequential part of an application executes on the CPU and the computationally intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include random access memory ("RAM") 914, read-only memory ("ROM") 916, an integrated storage memory ("integrated storage") 918, or a removable storage memory ("removable storage") 920. In some configurations, the RAM 914 or a portion thereof, the ROM 916 or a portion thereof, and/or some combination the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920. The RAM or any other component can also store the device module 915 or other software modules for causing execution of the operations described herein.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The magnetometer 928 is configured to measure the strength and direction of a magnetic field. In some configurations the magnetometer 928 provides measurements to a compass application program stored within one of the memory components 904 in order to provide a user with accurate directions in a frame of reference including the cardinal directions, north, south, east, and west. Similar measurements may be provided to a navigation application program that includes a compass component. Other uses of measurements obtained by the magnetometer 928 are contemplated.

The ambient light sensor 930 is configured to measure ambient light. In some configurations, the ambient light sensor 930 provides measurements to an application program stored within one of the memory components 904 in order to automatically adjust the brightness of a display (described below) to compensate for low-light and high-light environments. Other uses of measurements obtained by the ambient light sensor 930 are contemplated.

The proximity sensor 932 is configured to detect the presence of an object in proximity to the computing device without direct contact. In some configurations, the proximity sensor 932 detects the presence of a user's body (e.g., the user's face) and provides this information to an application program stored within one of the memory components 904 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 932 are contemplated.

The accelerometer 934 is configured to measure proper acceleration. In some configurations, output from the accelerometer 934 is used by an application program as an input mechanism to control some functionality of the application program. For example, the application program may be a video game in which a character, a portion thereof, or an object is moved or otherwise manipulated in response to input received via the accelerometer 934. In some configurations, output from the accelerometer 934 is provided to an application program for use in switching between landscape and portrait modes, calculating coordinate acceleration, or detecting a fall. Other uses of the accelerometer 934 are contemplated.

The gyroscope 936 is configured to measure and maintain orientation. In some configurations, output from the gyroscope 936 is used by an application program as an input mechanism to control some functionality of the application program. For example, the gyroscope 936 can be used for accurate recognition of movement within a 3D environment of a video game application or some other application. In some configurations, an application program utilizes output from the gyroscope 936 and the accelerometer 934 to enhance control of some functionality of the application program. Other uses of the gyroscope 936 are contemplated.

The GPS sensor 938 is configured to receive signals from GPS satellites for use in calculating a location. The location calculated by the GPS sensor 938 may be used by any application program that requires or benefits from location information. For example, the location calculated by the GPS sensor 938 may be used with a navigation application program to provide directions from the location to a destination or directions from the destination to the location. Moreover, the GPS sensor 938 may be used to provide location information to an external location-based service, such as E911 service. The GPS sensor 938 may obtain location information generated via WI-FI, WIMAX, and/or cellular triangulation techniques utilizing one or more of the network connectivity components 906 to aid the GPS sensor 938 in obtaining a location fix. The GPS sensor 938 may also be used in Assisted GPS ("A-GPS") systems.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interface described below, or may include processing functionality built-in to the processor 902.

The display 940 is an output device configured to present information in a visual form. In particular, the display 940 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 940 is a liquid crystal display ("LCD") utilizing any active or passive matrix technology and any backlighting technology (if used). In some configurations, the display 940 is an organic light emitting diode ("OLED") display. Other display types are contemplated.

The touchscreen 942, also referred to herein as a "touch-enabled screen," is an input device configured to detect the presence and location of a touch. The touchscreen 942 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 942 is incorporated on top of the display 940 as a transparent layer to enable a user to use one or more touches to interact with objects or other information presented on the display 940. In other configurations, the touchscreen 942 is a touch pad incorporated on a surface of the computing device that does not include the display 940. For example, the computing device may have a touchscreen incorporated on top of the display 940 and a touch pad on a surface opposite the display 940.

In some configurations, the touchscreen 942 is a single-touch touchscreen. In other configurations, the touchscreen 942 is a multi-touch touchscreen. In some configurations, the touchscreen 942 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 942. As such, a developer may create gestures that are specific to a particular application program.

In some configurations, the touchscreen 942 supports a tap gesture in which a user taps the touchscreen 942 once on an item presented on the display 940. The tap gesture may be used for various reasons including, but not limited to, opening or launching whatever the user taps. In some configurations, the touchscreen 942 supports a double tap gesture in which a user taps the touchscreen 942 twice on an item presented on the display 940. The double tap gesture may be used for various reasons including, but not limited to, zooming in or zooming out in stages. In some configurations, the touchscreen 942 supports a tap and hold gesture in which a user taps the touchscreen 942 and maintains contact for at least a pre-defined time. The tap and hold gesture may be used for various reasons including, but not limited to, opening a context-specific menu.

In some configurations, the touchscreen 942 supports a pan gesture in which a user places a finger on the touchscreen 942 and maintains contact with the touchscreen 942 while moving the finger on the touchscreen 942. The pan gesture may be used for various reasons including, but not limited to, moving through screens, images, or menus at a controlled rate. Multiple finger pan gestures are also contemplated. In some configurations, the touchscreen 942 supports a flick gesture in which a user swipes a finger in the direction the user wants the screen to move. The flick gesture may be used for various reasons including, but not limited to, scrolling horizontally or vertically through menus or pages. In some configurations, the touchscreen 942 supports a pinch and stretch gesture in which a user makes a pinching motion with two fingers (e.g., thumb and forefinger) on the touchscreen 942 or moves the two fingers apart. The pinch and stretch gesture may be used for various reasons including, but not limited to, zooming gradually in or out of a web site, map, or picture.

Although the above gestures have been described with reference to the use one or more fingers for performing the gestures, other appendages such as toes or objects such as styluses may be used to interact with the touchscreen 942. As such, the above gestures should be understood as being illustrative and should not be construed as being limiting in any way.

The data I/O interface component 944 is configured to facilitate input of data to the computing device and output of data from the computing device. In some configurations, the data I/O interface component 944 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 946 is configured to provide audio input and/or output capabilities to the computing device. In some configurations, the audio I/O interface component 946 includes a microphone configured to collect audio signals. In some configurations, the audio I/O interface component 946 includes a headphone jack configured to provide connectivity for headphones or other external speakers. In some configurations, the audio I/O interface component 946 includes a speaker for the output of audio signals. In some configurations, the audio I/O interface component 946 includes an optical audio cable out.

The video I/O interface component 948 is configured to provide video input and/or output capabilities to the computing device. In some configurations, the video I/O interface component 948 includes a video connector configured to receive video as input from another device (e.g., a video media player such as a DVD or BLURAY player) or send video as output to another device (e.g., a monitor, a television, or some other external display). In some configurations, the video I/O interface component 948 includes a High-Definition Multimedia Interface ("HDMI"), mini-HDMI, micro-HDMI, DisplayPort, or proprietary connector to input/output video content. In some configurations, the video I/O interface component 948 or portions thereof is combined with the audio I/O interface component 946 or portions thereof.

The camera 950 can be configured to capture still images and/or video. The camera 950 may utilize a charge coupled device ("CCD") or a complementary metal oxide semiconductor ("CMOS") image sensor to capture images. In some configurations, the camera 950 includes a flash to aid in taking pictures in low-light environments. Settings for the camera 950 may be implemented as hardware or software buttons. The camera can also include any type of sensor using any type of modality, e.g., a first modality may be under infrared, a second modality may be under a different spectrum, e.g., visible light, laser, etc. The camera may also include a time-of-flight sensor which can operate using any suitable medium, e.g., sonar, radar, etc. the camera can also be in the form of a lidar sensor for capturing images and distances device and will object in a surrounding environment.

Although not illustrated, one or more hardware buttons may also be included in the computing device architecture 900. The hardware buttons may be used for controlling some operational aspect of the computing device. The hardware buttons may be dedicated buttons or multi-use buttons. The hardware buttons may be mechanical or sensor-based.

The illustrated power components 914 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The battery gauge 954 can be configured to measure battery parameters such as current, voltage, and temperature. In some configurations, the battery gauge 954 is configured to measure the effect of a battery's discharge rate, temperature, age and other factors to predict remaining life within a certain percentage of error. In some configurations, the battery gauge 954 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 912 may also include a power connector, which may be combined with one or more of the aforementioned I/O components 910. The power components 912 may interface with an external power system or charging equipment via an I/O component.

The detailed description is supplemented by the following clauses.

Clause A: A computer-implemented method for controlling an invocation of a precision input mode using a detected gaze fixation level, the computer-implemented method configured for execution on a system (100) comprising: analyzing input data from a first input device (132D) indicating an orientation of at least one eye of a user (102), wherein the input data defines a gaze direction (134) that is analyzed for controlling a pointer location (201) of a viewing area (200); analyzing additional input data to determine if the additional input data indicates a predetermined gesture performed by the user (102) for invoking the precision mode, wherein the system is configured to permit the additional input data to invoke the precision mode when the gaze direction defined in the input data indicates a threshold fixation level; and in response to determining that the additional input data meets one or more criteria and in response to determining that the gaze direction defined in the input data indicates the threshold fixation level, invoking the precision mode to cause the system (100) to utilize a second input device (132E) to control the pointer location (201) of the viewing area (200), wherein the invocation of the precision mode causes the system (100) to decouple the control of the pointer location (201) from the first input device (132D).

Clause B: The method of Clause A, wherein the additional input data meets the one or more criteria when the input data includes image data depicting a hand gesture of the user performing a pinch gesture with two predetermined fingers.

Clause C: The method of Clauses A and B, wherein the hand gesture performing the pinch gesture includes an action of the user moving a middle finger and a thumb toward one another.

Clause D: The method of Clauses A through C, wherein the pinch gesture includes a user action where the two predetermined fingers are moving toward one another at a velocity that is less than a threshold velocity, wherein the additional input data does not meet the one or more criteria if the pinch gesture includes the two predetermined fingers moving toward one another at the velocity that is greater than the threshold velocity.

Clause E: The method of Clauses A through D, wherein the additional input data meets the one or more criteria when the additional input data includes sensor data indicating movement of a head of the user.

Clause F: The method of Clauses A through E, wherein the additional input data meets the one or more criteria when the additional input data includes sensor data indicating movement of a head of the user in a predetermined direction.

Clause G: The method of Clauses A through F, wherein the additional input data meets the one or more criteria when the additional input data includes controller data indicating a touch gesture, an actuation of a button on the second input device, or a gesture performed on a phone paired with the system.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A computer-implemented method for controlling an invocation of a precision mode using a detected gaze fixation level, the computer-implemented method configured for execution on a system comprising:
    analyzing input data from a first input device indicating an orientation of at least one eye of a user, wherein the input data defines a gaze direction that is analyzed for controlling a pointer location of a viewing area;
    analyzing additional input data to determine if the additional input data indicates a predetermined gesture performed by the user for invoking the precision mode, wherein the system is configured to permit the additional input data to invoke the precision mode when the gaze direction defined in the input data indicates a threshold fixation level; and
    in response to determining that the additional input data meets one or more criteria and in response to determining that the gaze direction defined in the input data indicates the threshold fixation level, invoking the precision mode to cause the system to utilize a second input device to control the pointer location of the viewing area, wherein the invocation of the precision mode causes the system to decouple the control of the pointer location from the first input device.

2. The method of claim 1, wherein the additional input data meets the one or more criteria when the input data includes image data depicting a hand gesture of the user performing a pinch gesture with two predetermined fingers.

3. The method of claim 2, wherein the hand gesture performing the pinch gesture includes an action of the user moving a middle finger and a thumb toward one another.

4. The method of claim 2, wherein the pinch gesture includes a user action where the two predetermined fingers are moving toward one another at a velocity that is less than a threshold velocity, wherein the additional input data does not meet the one or more criteria if the pinch gesture includes the two predetermined fingers moving toward one another at the velocity that is greater than the threshold velocity.

5. The method of claim 1, wherein the additional input data meets the one or more criteria when the additional input data includes sensor data indicating movement of a head of the user.

6. The method of claim 1, wherein the additional input data meets the one or more criteria when the additional input data includes sensor data indicating movement of a head of the user in a predetermined direction.

7. The method of claim 1, wherein the additional input data meets the one or more criteria when the additional input data includes controller data indicating a touch gesture, an actuation of a button on the second input device, or a gesture performed on a phone paired with the system.

8. A computing device for controlling an invocation of a precision mode using a detected gaze fixation level generating a visual cue providing awareness to content updates, comprising:
    one or more processors; and
    a computer-readable storage medium having encoded thereon computer-executable instructions to cause the one or more processors to perform a method comprising:
    analyzing input data from an input device operating with a first input modality, wherein the input data indicates an orientation of at least one eye of a user, wherein the input data defines a gaze direction that is analyzed for controlling a pointer location of a viewing area;
    analyzing additional input data to determine if the additional input data indicates a predetermined gesture performed by the user for invoking the precision mode, wherein the system is configured to permit the additional input data to invoke the precision mode when the gaze direction defined in the input data indicates a threshold fixation level; and
    in response to determining that the additional input data meets one or more criteria and in response to determining that the gaze direction defined in the input data indicates the threshold fixation level, invoking the precision mode to cause the system to utilize the input device to control the pointer location of the viewing area using a second input modality, wherein the invocation of the precision mode causes the system to discontinue using the first input modality to control the pointer location.

9. The computing device of claim 8, wherein the gaze direction defined in the input data indicates the threshold fixation level when the gaze direction controls the pointer location toward an object in the view for a predetermined time period.

10. The computing device of claim 8, wherein the gaze direction defined in the input data indicates the threshold fixation level when the gaze direction controls the pointer location toward a display region within the view for a predetermined time period.

11. The computing device of claim 8, wherein the gaze direction defined in the input data indicates that an eye of the user has less than a threshold level of movement, wherein the movement is measured by a rate of angular rotation or a velocity of an ocular feature.

12. The computing device of claim 8, wherein the additional input data meets the one or more criteria when the input data includes image data depicting a hand gesture of the user performing a pinch gesture with two predetermined fingers.

13. The computing device of claim 12, wherein the hand gesture performing the pinch gesture includes an action of the user moving a middle finger and a thumb toward one another.

14. The computing device of claim 12, wherein the pinch gesture includes a user action where the two predetermined fingers are moving toward one another at a velocity that is less than a threshold velocity, wherein the additional input data does not meet the one or more criteria if the pinch gesture includes the two predetermined fingers moving toward one another at the velocity that is greater than the threshold velocity.

15. The computing device of claim 8, wherein the additional input data meets the one or more criteria when the additional input data includes sensor data indicating movement of a head of the user.

16. A computing device for controlling an invocation of a precision mode using a detected gaze fixation level generating a visual cue providing awareness to content updates, comprising:
   one or more processors; and
   a computer-readable storage medium having encoded thereon computer-executable instructions to cause the one or more processors to perform a method comprising:
   analyzing input data from a first input device indicating an orientation of at least one eye of a user, wherein the input data defines a gaze direction that is analyzed for controlling a pointer location of a viewing area;
   analyzing additional input data to determine if the additional input data indicates a predetermined gesture performed by the user for invoking the precision mode, wherein the system is configured to permit the additional input data to invoke the precision mode when the gaze direction defined in the input data indicates a threshold fixation level; and
   in response to determining that the additional input data meets one or more criteria and in response to determining that the gaze direction defined in the input data indicates the threshold fixation level, invoking the precision mode to cause the system to utilize a second input device to control the pointer location of the viewing area, wherein the invocation of the precision mode causes the system to decouple the control of the pointer location from the first input device.

17. The computing device of claim 16, wherein the additional input data meets the one or more criteria when the input data includes image data depicting a hand gesture of the user performing a pinch gesture with two predetermined fingers.

18. The computing device of claim 17, wherein the hand gesture performing the pinch gesture includes an action of the user moving a middle finger and a thumb toward one another.

19. The computing device of claim 17, wherein the pinch gesture includes a user action where the two predetermined fingers are moving toward one another at a velocity that is less than a threshold velocity, wherein the additional input data does not meet the one or more criteria if the pinch gesture includes the two predetermined fingers moving toward one another at the velocity that is greater than the threshold velocity.

20. The computing device of claim 16, wherein the additional input data meets the one or more criteria when the additional input data includes sensor data indicating movement of a head of the user.

* * * * *